United States Patent [19]
Warburton

[11] Patent Number: 5,459,644
[45] Date of Patent: Oct. 17, 1995

[54] WIRING DISTRIBUTION FRAME

[76] Inventor: Kenneth J. Warburton, 200 Fulton St., Hempstead, N.Y. 11550

[21] Appl. No.: 375,516

[22] Filed: Jan. 18, 1995

Related U.S. Application Data

[63] Continuation of Ser. No. 103,330, Aug. 6, 1993, abandoned.

[51] Int. Cl.⁶ .................................................. H02B 1/20
[52] U.S. Cl. ........................ 361/826; 379/326; 379/327; 379/397; 29/592.1
[58] Field of Search .................................... 361/601–602, 361/622, 624, 627, 641, 644–645, 826–828; 379/326–329, 397; 439/709–710, 715–716; 174/79, 72 A, 72 B; 29/592.1

[56] References Cited

U.S. PATENT DOCUMENTS 816,847   4/1906   Cook .
822,590   6/1906   Dommerque .
3,833,840   9/1974   Sinden ................................ 317/122
3,943,412   3/1976   Wickstrom ............................ 317/99
4,260,856   4/1981   Saligny ................................ 179/98
4,262,173   4/1981   Saligny ................................ 179/98
4,371,757   2/1983   Debortoli et al. .................... 179/98
4,390,755   6/1983   Pierresteguy ........................ 179/98

Primary Examiner—Bot L. Ledynh
Attorney, Agent, or Firm—Banner & Allegretti, Ltd.

[57] ABSTRACT

A self-closing main distributing frame of any shape, (e.g. rectangular) which increases its capacity by growth in the vertical direction. The frame includes a stack of self-closing horizontal planes, or shelves, open to the outer face, and supported by brackets attached to vertical members on the interior face.

41 Claims, 7 Drawing Sheets

CROSS CONNECTION DENSITY VS CROSS SECTION NUMBER
(2 SETS OF 10 POINTS RANDOMLY INTERCONNECTED)

- LINEAR CONFIGURATION
- SELF-CLOSING CONFIGURATION

AVERAGE CROSS CONNECTION LENGTH VS FRAME SIZE

WIRING DISTRIBUTION FRAME

This application is a continuation of application Ser. No. 08/103,330, filed Aug. 6, 1993, now abandoned.

BACKGROUND OF THE INVENTION

1. Field of the Invention

This invention relates to distributing frames for wiring interconnection.

2. Related Art

Conventional Distributing Frames, or DF's, are typically a cross-hatch of vertical and horizontal planes, so that outside cable pairs terminated on the vertical side may be interconnected to central office equipment cable pairs, terminated on the horizontal side. Interconnection of outside terminal pairs and equipment terminal pairs is effected by means of two-wire cords known as cross-connections, or jumpers. Vertical planes provide a means for cross-connections to move vertically, and horizontal planes, or shelves, provide a means for cross-connections to move horizontally.

FIG. 1 illustrates a small conventional linear distributing frame, consisting of 10 verticals (V1 through V10) and 3 shelves (S1 through S3). Each vertical has a termination capacity of 30 outside cable pairs, and each shelf has a termination capacity of 100 equipment cable pairs. In FIG. 1, numbers of shelves, verticals, and individual terminals have been limited to small amounts so that interconnection principles can be more easily illustrated. The actual number of shelves on a conventional DF typically ranges from 12 to 16, and the number of verticals from 100 to 500 or more. Termination capacities of verticals on conventional DF's typically range from 600 to 800; termination capacity of conventional shelves typically ranges from 40 to 60 pairs per opposing vertical.

In the distributing frame of FIG. 1, an outside wire cable 1 travels from the central office cable vault, through a slot 2, continuing on one face (called the cable face) of vertical V3, where it is terminated on an outside wire connector block 3. The number of terminals on the connector block 3 match the number of pairs contained in the outside cable. These terminals project through to the other face of the vertical plane, called the cross-connect side or face. An individual terminal pair 4 on the connector 3, is shown being cross-connected via a two-wire cord 5 which travels down the cross-connect face of vertical V3, through a ring 6, located at the intersection of vertical V3 and shelf S2, horizontally along the top face of shelf S2, and terminating on an individual terminal pair 7, located on equipment connector block 8. The terminals on the horizontal connector block likewise project through the block to the lower face of the shelf, where they are connected to a pair of wires in a central office equipment cable 9. This cable 9 travels on the lower face of the shelf S2, up the cable face of vertical V8, and onto an overhead cable rack 10, leading to the switch or other equipment.

FIG. 2 illustrates the final state of a vertical and a shelf of the DF shown in FIG. 1, wherein an ideal or perfect distribution of equipment was made to outside cable pairs. All individual outside cable terminals 4 on vertical V are connected to equipment terminals located on shelves physically closest to them. All cross-connections 5, therefore, pass through the closest ring 6. Upon entering the shelf S, these cross-connections are connected to the physically closest individual equipment terminals 7.

In FIG. 2, the density of cross-connections in all cross-sections would be measured as zero, since no cross-connections pass through any of them. Also, the lengths of all cross-connections made, in terms of the number of cross-sections traveled, would be zero.

In theory, equipment growth would be matched perfectly with outside cable requirements and growth, resulting in the ideal distribution state depicted in FIG. 2. In reality, however, this ideal final distribution state will rarely, if ever, exist. This is partly because the initial distribution state is typically as shown in FIG. 3. In FIG. 3, some initial multiple cross-connections are made on the DF shown in FIG. 1. A total of seven cross-connections 5 travel from their respective individual outside cable pair terminals 4, on any vertical V, through their respective rings 6, and onto various shelves. On any shelf S, a total of 4 cross-connections 5, travel from their respective rings 6, and terminate on various individual equipment pair terminals 7. Densities 17 of cross-connections in vertical cross-sections 15 are shown as counts of cross-connections passing through them. Densities 18 of cross-connections in horizontal cross-sections 16 are likewise shown as counts of cross-connections passing through them.

Historically, every effort was made to keep the state of the distribution as close as possible to the ideal state shown in FIG. 2. Maintaining a close to ideal state may be possible on a small scale, but as a DF grows to larger dimensions and frame activity (disconnects and connects) increases, the chances of this happening become smaller. The question of what the predictable final distribution state of a DF will be is significant to DF design because densities and lengths of cross-connections at ultimate capacity depend on this. The lack of an accurate prediction of a final distribution state has hampered many prior re-design efforts.

FIG. 4 illustrates the final state of vertical V and shelf S when the distribution is perfectly random. In FIG. 4, ten cross-connections emanate from every vertical terminal group 11, and are equally dispersed to each of the rings 6. This is indicated by each of the lines 12, each containing 3 and ⅓ cross-connections. Densities 17 in each of the vertical cross-sections 15 are shown. Each ring 6, in turn, receives 3 and ⅓ cross-connections from each vertical terminal group 11, for a total of 10 cross-connections passing through each ring 6, and traveling onto each shelf. On any shelf S, all rings 6 disperse all 10 cross-connections 13 equally to all 10 horizontal terminal groups 14. Thus, each line 13 on shelf S represents a single cross-connection. Densities 18 in each of the horizontal cross-sections 16 are shown.

In reality, the final state of the DF shown in FIG. 1 would not be exactly as shown in FIG. 4. For one reason, fractional cross-connections do not exist. For another, real randomness is seldom, if ever, perfect. However, the perfectly random final state does represent an analyzable situation. It also most accurately represents the statistical probability statement that all outside cable pairs have an equal probability of being connected to any equipment cable pair. Since a primary goal of any central office design was to match and coordinate, as closely as possible, equipment expansion with outside cable expansion, and implement a cable assignment process which would produce a distribution as close to the ideal as possible, the perfect random state may be regarded as an accurate upper limit of the randomness of the final state of the frame.

Some of the prior art attempts at reducing interconnection lengths and densities have failed because their designs were based on the assumption that the randomness of matching outside cable pair to inside cable pair was primarily limited to randomly matching pairs of one outside cable to pairs of one inside cable.

Using the perfect random final state as an upper limit, the following can be proved for the conventionally designed horizontal growth distributing frame:

1. The average cross-connection length on either a vertical or a horizontal plane is one-third the length of that plane. Total average length, therefore, is one-third the length of the vertical plane plus one-third the length of the horizontal plane. On a conventional DF, the vertical plane length remains constant while the horizontal length grows. The final average length, therefore, is very accurately approximated as one-third the length of the horizontal plane. On some existing DF's, this is as much as 150 feet or more.

2. The maximum cross-connection length is the full length of the vertical plane plus the full length of the horizontal plane. Since horizontal plane length is much greater than vertical plane length, the maximum cross-connection length is accurately approximated as simply the length of the horizontal plane.

3. Density variation on both the vertical and horizontal planes is parabolic, having a maximum at the mid-point, and a minimum at the extremities. This is not much of a problem on the conventional vertical plane, since it never increases in length, and hanging wires do not tangle as easily as a pile resting on a shelf. However, on long shelves, the density buildup at the mid-point can have catastrophic effects, causing DF abandonment and re-termination to another frame. The cost of this is easily in the millions of dollars.

The limitations inherent in conventional DF design have led, in many cases, to the creation of intermediate DFs, or IDFs. These IDFs must be connected to the main DF (MDF) containing outside cable pair terminations, and to each other. This is accomplished by a system of tie cables inside the central office building. As more outside cable pairs enter a central office building, IDFs and associated tie cables proliferate. Proliferation of IDFs wastes floor space that could be used for switches or other central office equipment. Further, proliferation of tie cables wastes duct and rack space that could be used for outside wire riser cables and interior equipment cable. The overall effect, especially in large metropolitan areas, where high rise buildings are common, is that the volume of space available within a building is under-utilized, causing less $/cubic foot to be earned than is ultimately possible.

SUMMARY OF THE INVENTION

This invention seeks to remedy problems found in the prior art by first assuming that any cable pair of any outside cable is as equally likely of being connected to any equipment pair of any equipment cable as any other pair of any other equipment cable. The invention allows for a distribution state close to a perfect random final distribution state at all stages of DF growth. By assuming this state to present, various geometric configurations of outside and inside terminals can be analyzed on a common basis.

The inventor has discovered that the problems of excessive interconnection length and mid-point congestion on horizontal planes under random interconnection conditions can be controlled by using two techniques:

1. Closing the horizontal planes on themselves, thereby eliminating a mid-point.
2. Using vertical growth to a height which balances distances traveled horizontally.

The distributing frame of the present invention is well suited for use in telecommunications systems, where equipment pairs must be distributed to outside cable pairs, but may also be used where any random interconnection of cabling is required.

In a preferred embodiment, all connector blocks (for both inside and outside cable) are located on the outer edge of the horizontal planes, thus requiring only access to the outer face for the purpose of installing and removing interconnections, or the maintenance testing of outside cable pairs or equipment pairs terminated on the equipment blocks. Access to the enclosed interior area is required only when riser cables containing outside cable pairs need to be installed.

For telecommunications use, interconnection between equipment and outside cable pairs is effected by means of two-wire cords called cross-connections, or jumpers. Presently, these could also take the form of fiber optic strands. For other applications, as, for example, interconnecting computer terminals, these interconnections may be coaxial tubes or some other suitable form of conductor.

Interconnections travel horizontally and circumferentially on the shelves and vertically up and down passageways formed by adjacent vertical support members at the rear of the shelves. The flow of interconnections between shelves and vertical passages is controlled by means of slots, designed primarily to control the entry of the interconnection onto the lower shelf.

The self-closing design of the horizontal planes permits interconnection travel in two directions. When the shorter path is always taken, interconnection lengths and densities on the shelves are greatly reduced. When the proper height to circumference ratio is employed, average interconnection lengths and maximum densities are further reduced to a small fraction of those encountered on conventional linear horizontal growth distributing frames of equivalent termination capacity.

The design of the present distributing frame is based on the assumption that all individual terminals on any connecting block have an equal probability of being connected to any individual terminals on any other connecting block. When this assumption is made, average interconnection length and maximum interconnection densities and locations can be calculated and accurately predicted.

The present distributing frame permits any individual terminal pair to be connected to any other individual terminal pair, using a single self-closing main distributing frame, designed to grow in the vertical direction to an optimum height, with interconnection lengths and densities well within the limits established for much smaller conventional distributing frames. The arrangement obviates the need for all intermediate distributing frames and associated tie cables needed to interconnect them. This is especially useful in large, densely populated metropolitan areas where high rise buildings are common, and real estate for central office buildings is at a premium.

BRIEF DESCRIPTION OF THE DRAWINGS

Like reference numerals appearing in more than one figure represent like elements.

DETAILED DESCRIPTION OF THE PREFERRED EMBODIMENTS

Figure 1:
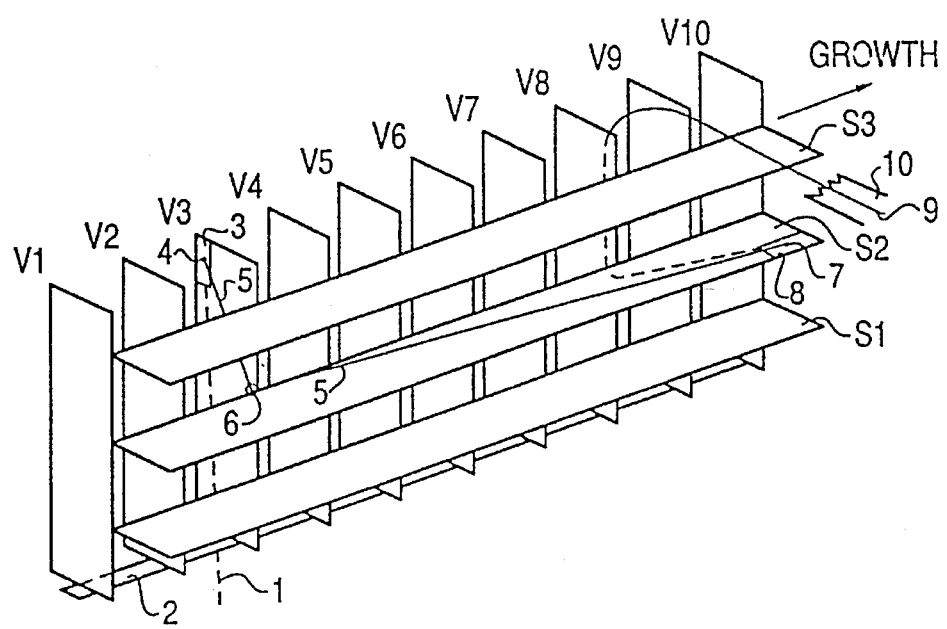
FIG. 1 illustrates a prior art conventional distributing frame. The traveling path of 1 interconnection is shown.
Figure 2:
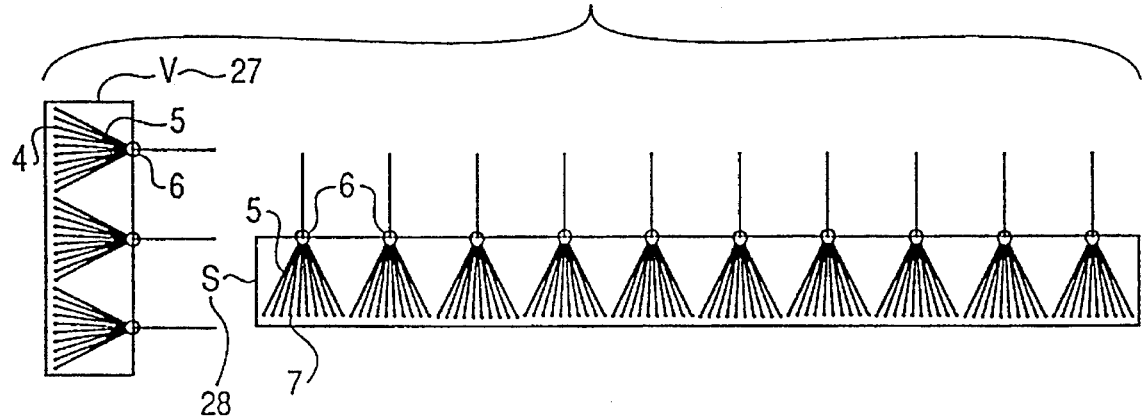
FIG. 2 illustrates an ideal final distribution state on a particular vertical and shelf of the DF shown in FIG. 1.
Figure 3:
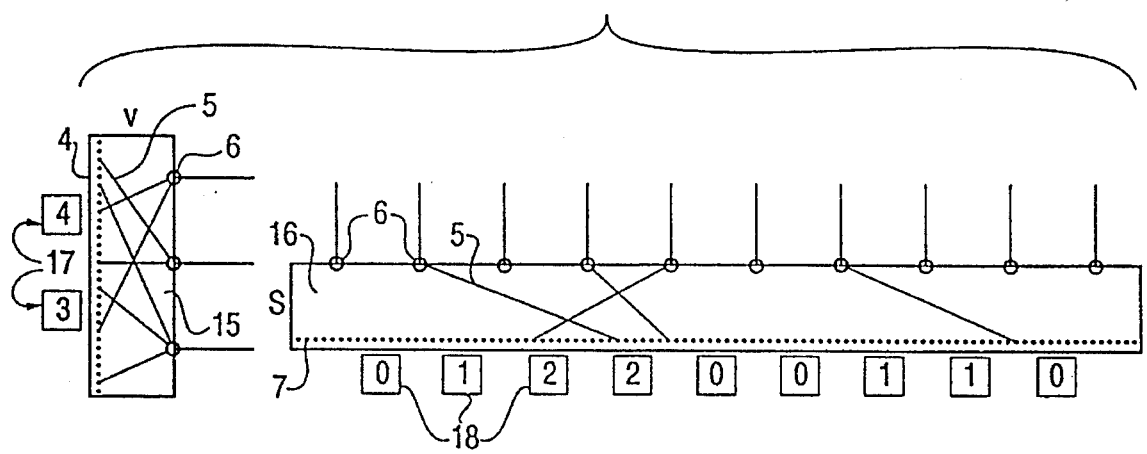
FIG. 3 illustrates the usual initial interconnections which would be made on the prior art DF of FIG. 1.
Figure 5:
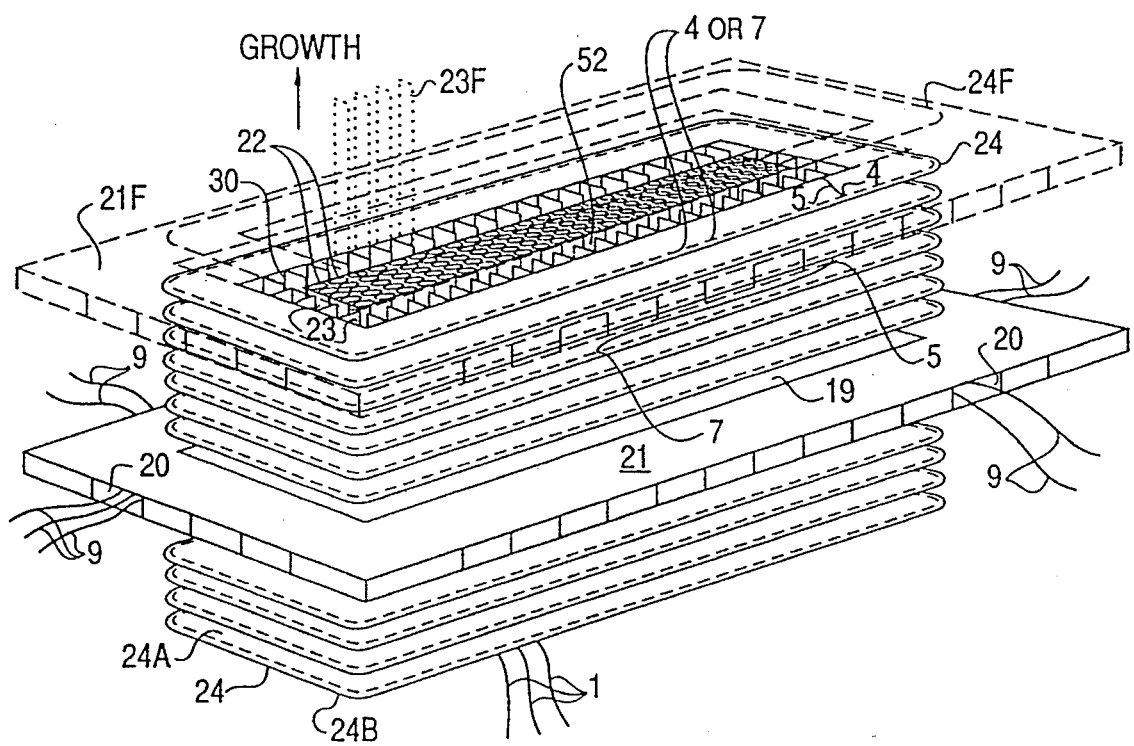
FIG. 5 is an isometric view a self-closing vertical growth DF according to an embodiment of the present invention.

FIG. 5 is an isometric view of a self-closing vertical growth distributing frame according to an embodiment of the present invention. The DF of FIG. 5 includes fifty verticals 23, fourteen shelves 24, and is rectangular in shape as viewed from the top. The DF of FIG. 5 is "self-closing" in that the horizontal shelves 24 close on themselves, causing what would be the first and last vertical V1, V10 on a conventional linear DF (such as shown in FIG. 1) to be adjacent to each other rather than at opposite (and hence furthest apart) ends of the frame. Thus, the distributing frame of FIG. 5 is formed into an annular-like shape having an outer face 50 an inner face 51 and an inner open area 52 circumscribed by the distributing frame body.

Each of the shelves 24 has a first (cross connect) face 24A for providing horizontal circumferential travel of wiring interconnections, and a second (cable) face 24B for serving as a travel surface for connector cables. Each of the verticals also has a cable face VF1 which serves as a traveling surface for outside wire connector cables, and an opposing cross-connect face VF2 which serves as a traveling surface for inside wire connector cables.

Vertical growth means that the DF increases its termination capacity by increasing the height of the vertical members and the number of horizontal members or shelves. The direction of growth is indicated by the arrow, with expansion shelves 24F and future vertical member extensions 23F being shown in dashed lines.

The frame of FIG. 5 can be extended in the vertical direction be means of extending the vertical member ironwork, by connecting the extension pieces 23F to the existing verticals by way of bolts, welding or any other suitable form of attachment. The additional self closing shelves 24F are attached to the extension pieces, also by bolts, welding or any other suitable form of attachment.

Walking bridges 21 are installed at approximately seven foot intervals. These are used for workers to access the upper levels of the DF. A future expansion walking bridge 21F is indicated in dashed lines. Ladders or small stairways (not shown) are used to interconnect the walking bridges. The expansion walking bridges are repeated at the approximate seven foot intervals until the final design height of the DF is reached.

Inside wire cables 9 coming from central office equipment located about the periphery of the DF runs through slots 20 in the walking bridge 21 and continue vertically on one face of a vertical member (as shown by 9A in FIG. 5A) until they reach the shelf level of the connector block on which they terminate. The wire cables then run horizontally on the lower face of that shelf until the terminating connector block is reached.

Outside wire cables 1 run in riser ducts 22 coming from the central office cable vault. By way of example, these ducts are shown as clustered within the interior of the DF. Provisions may also be made for riser ducts containing outside wire riser cables to be installed elsewhere, with entry to splicing traps 19 also being effected by means of the slots 20 in the walking bridges 21. When an interior cluster of riser ducts is used, the outer layers of the cluster are used for the lower portion of the DF, and the inner ducts are used to transport riser cables to the upper portion of the DF.

Figure 5A:
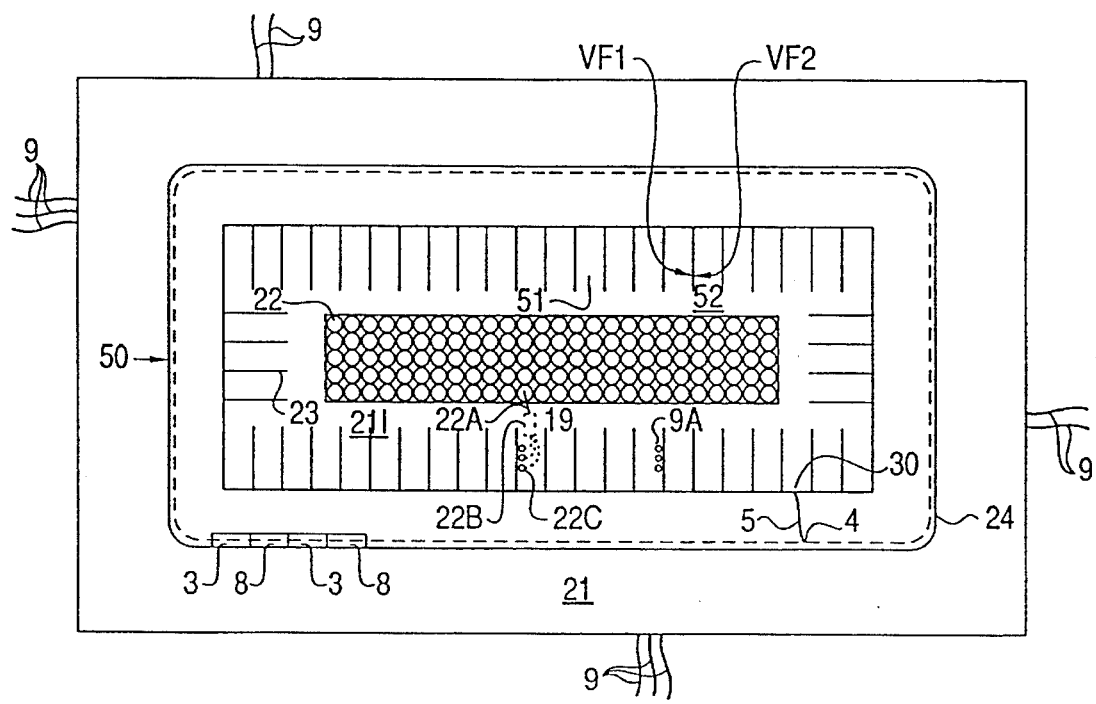
FIG. 5A is a top view of the DF of FIG. 5.

FIG. 5A is a top view of the DF of FIG. 5. The interior walking bridge 21I is an interior extension of the walking bridge 21. A riser cable 22A is shown leaving a riser duct 22 and entering a splice 22B located in a splicing trap 19 contained under the floor surface of the interior walking bridge 21I. Exiting from the splice 22B are connector tails 22C which travel vertically on one face of a vertical member 23 until they reach the level of their shelf destination, whereupon they travel on the lower surface of the shelf until they reach their outside wire connector blocks located on the outer edge of the shelf. Electrical surge protection may be provided in the connector block itself, or some other suitable location, such as the edges of the interior vertical members.

Turning again to FIG. 5, there is shown an interconnection 5 between an individual outside cable terminal pair 4 and an individual inside cable terminal pair 7. The horizontal path on both shelves 24 is also shown. The vertical traveling surface which the interconnection uses to get from the upper shelf to the lower shelf can be best seen in FIG. 5A.

Figure 6:
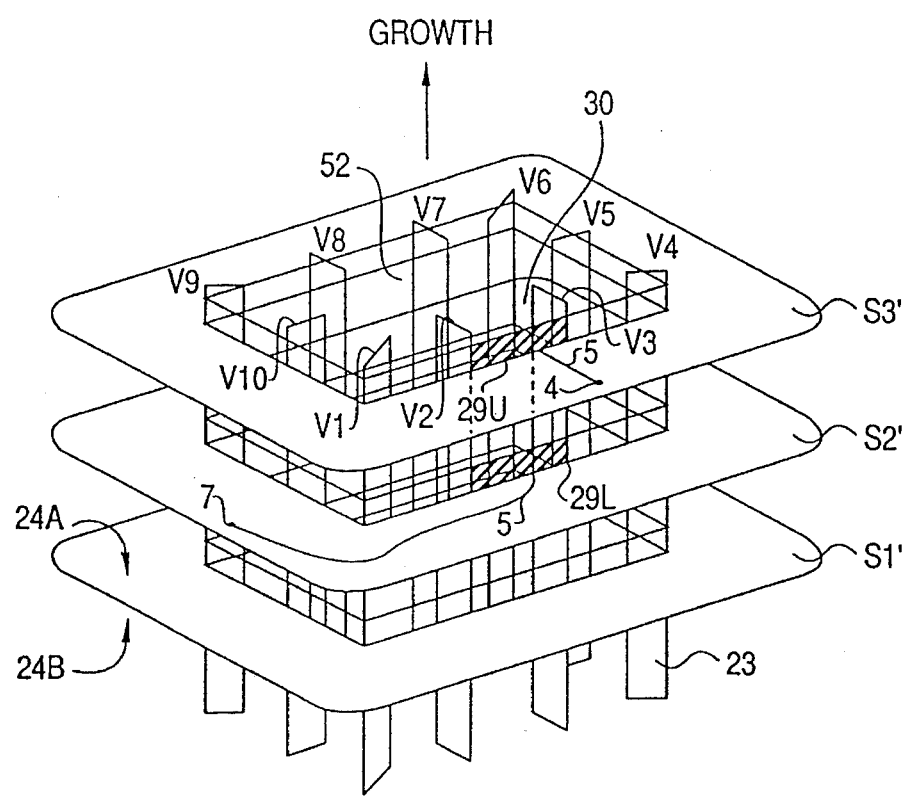
FIG. 6 shows a smaller, more simplified self-closing vertical growth DF.

FIG. 6 shows a smaller, more simplified self-closing vertical growth DF. The DF of FIG. 6 will be used in order to more closely examine the effects of self closure of the horizontal planes.

When horizontal planes are closed on themselves, 2 paths become available for every interconnection traveling between a terminal on the outer edge of the shelf and either (a) another terminal on the same shelf, or (b), the slot leading to the vertical shaft at the interior edge of the shelf. Since 2 paths are available, in the large majority of cases, one path will be shorter than the other. It's natural, and valid, to assume that a worker would take the shorter path to effect an interconnection. In the rare cases where the paths are equidistant, it's also valid to assume that half the time a clockwise direction would be taken, and half the time, counter-clockwise.

The availability of two routes has some astounding effects, one being that the maximum length interconnection now travels only to the adjacent terminal point. The DF of FIG. 6 depicts what the DF of FIG. 1 would look like if it were made into a self-closing vertical growth DF according to principles of the present invention. Like the DF of FIG. 1, the self-closing DF of FIG. 6 includes ten verticals V1–V10. In contrast, however, to the linear shelves (S1–S3) in the DF of FIG. 1, the DF of FIG. 6 includes three self closing shelves S1'–S3'. As with the DF of FIG. 5, each shelf S1'–S3' has a first face 24A which serves as a surface for horizontal circumferential travel of wiring interconnections, and a second face 24B which serves as a travel surface for connector cables. For purposes of comparison, the same single interconnection is shown interconnecting the same individual terminals. In contrast to the DF of FIG. 1, in the DF of FIG. 6 both terminals 4, 7 are on the outer edges of horizontal planes, and the interconnection 5, travels from outside cable pair 4 on shelf S3', through the slot 29U on the interior edge of shelf S3, down the vertical passageway 30 between verticals V2 and V3, to shelf S2', through the slot 29L onto shelf S2', and clockwise (when viewed from the top) on shelf S2' to inside cable terminal 7, located approximately opposite vertical V10. The number of vertical cross-sections traveled is the same as in FIG. 1, but the number of horizontal cross-sections traveled has been reduced from seven to three.

Figure 4:
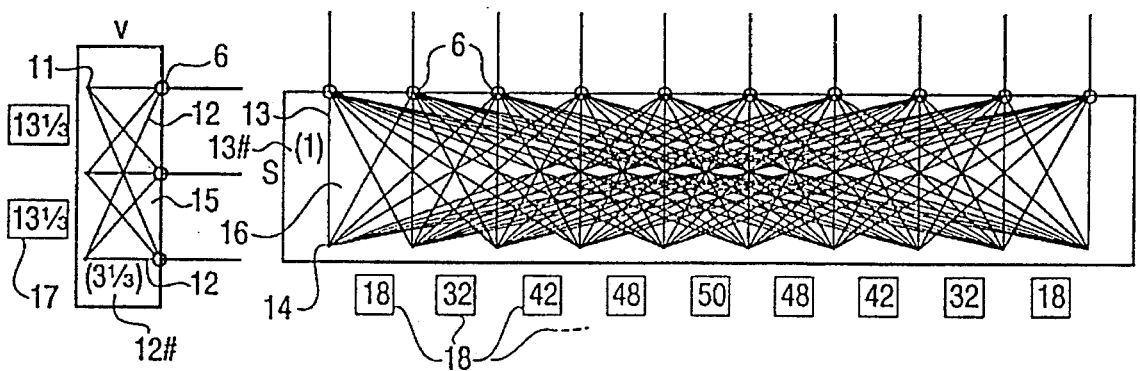
FIG. 4 illustrates a perfect random final distribution state on a vertical and shelf of the DF of FIG. 1.
Figure 7:
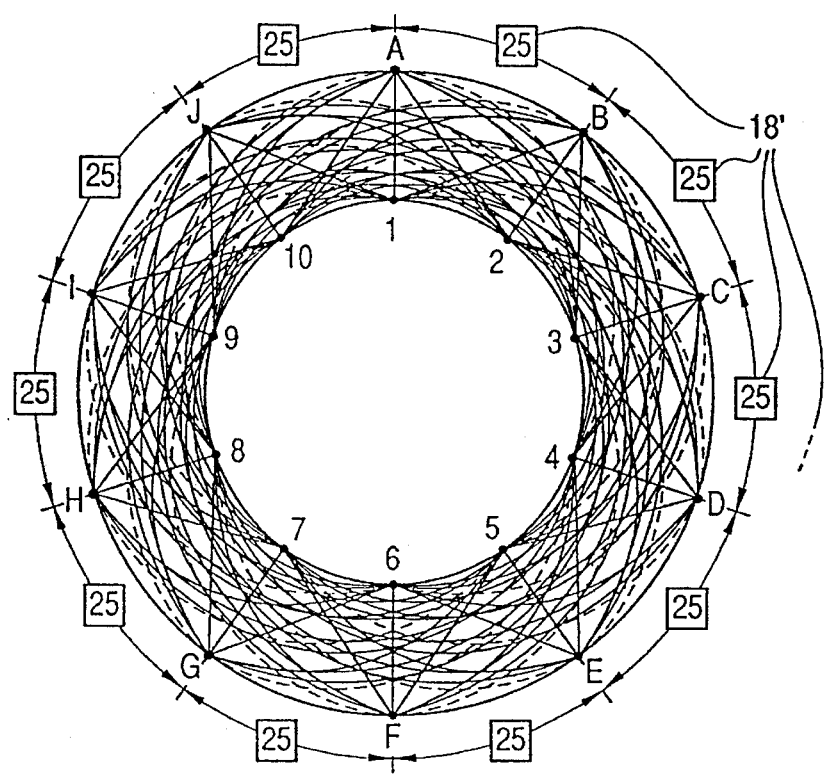
FIG. 7 illustrates the perfect random final distribution state of the DF of FIG. 6 having the same interconnections as those shown in the DF of FIG. 4.
Figure 8:
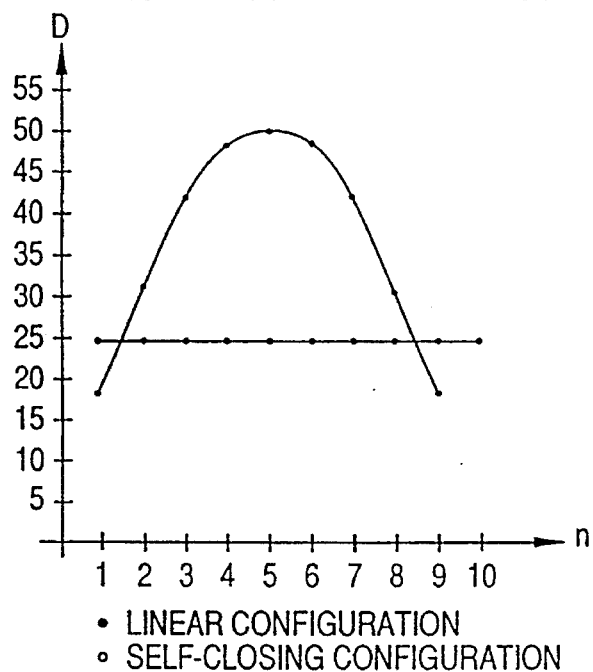
FIG. 8 is a graphical comparison of the densities found in the cross-sections of the shelves shown in FIG. 1 (prior art) and FIG. 5 (self-closing shelf)

When all interconnections are made on the DF of FIG. 6 in the same perfect random manner as on the DF of FIG. 1, the densities of the vertical passages 12 will be the same as vertical V of FIG. 4, but the densities 18' of the cross-sections of the self-closing shelves will be as shown in FIG. 7. An equal number of interconnections pass through each cross-section in FIG. 7, as compared to the varying amounts shown in FIG. 4. (Dashed lines in FIG. 7 indicate half-connection because two equidistant longest paths exist.) Note that in FIG. 4 the amounts are a minimum at the ends and increase to a maximum at the mid-point. Note also that the mid-point maximum of FIG. 4 is twice the constant amount shown in FIG. 7. Also note the 1-J interconnection travels through only 1 cross-section in FIG. 7, whereas it travels through 9 cross-sections in FIG. 4. A comparative plot of both densities is shown in FIG. 8.

In the prior art DF of FIG. 4, the density variations are parabolic, with the maximum always at the mid-point. In contrast, in the self-closing DF of FIG. 7, no density variation exists, and the constant density is always half the maximum found on the linear shelf, and is less than the linear shelf density for 70% of the cross-sections on the shelf. Also, the average length of interconnection on the linear shelf is ⅓ the length of the shelf, whereas on the self-closing shelf, it is ¼ the circumference. This represents a 25% reduction in average length for distances traveled on equivalent horizontal planes.

Attempting to gain the advantages of self-closure in the vertical direction would lead to a shape similar to a sphere (if the closure was inward) or a toroid (if the closure was outward). However, such shapes would be very impractical for running or removing interconnections. In addition, the entire structure would have to be initially built, and no expansion past that point would be possible, except by increasing the concentration of terminals on the edges. This leaves linear growth in the vertical direction as the most practical alternative.

Linear growth in the vertical direction allows for longer distances to be traveled vertically than on prior art designs of the type shown in FIG. 1. In the DF of FIG. 1, vertical distances are limited to the height of the frame (constant—e.g. about 12 or 16 feet), and are small compared to horizontal distances. However, according to an embodiment of the present invention, where linear growth is in the vertical direction, such vertical distances can be significant and must be considered.

The inventor has recognized that the minimum overall average distance traveled will always occur, for a given number of points, when they are arranged such that the height equals the horizontal length. Adapting this principle to a self-closing DF, wherein the average horizontal distance traveled is ¼ the circumference of the shelf, the optimum height would occur when the height is ¾ the circumference, at which point the average vertical linear distance traveled and the average horizontal circumferential distance traveled would be the same.

Figure 11:
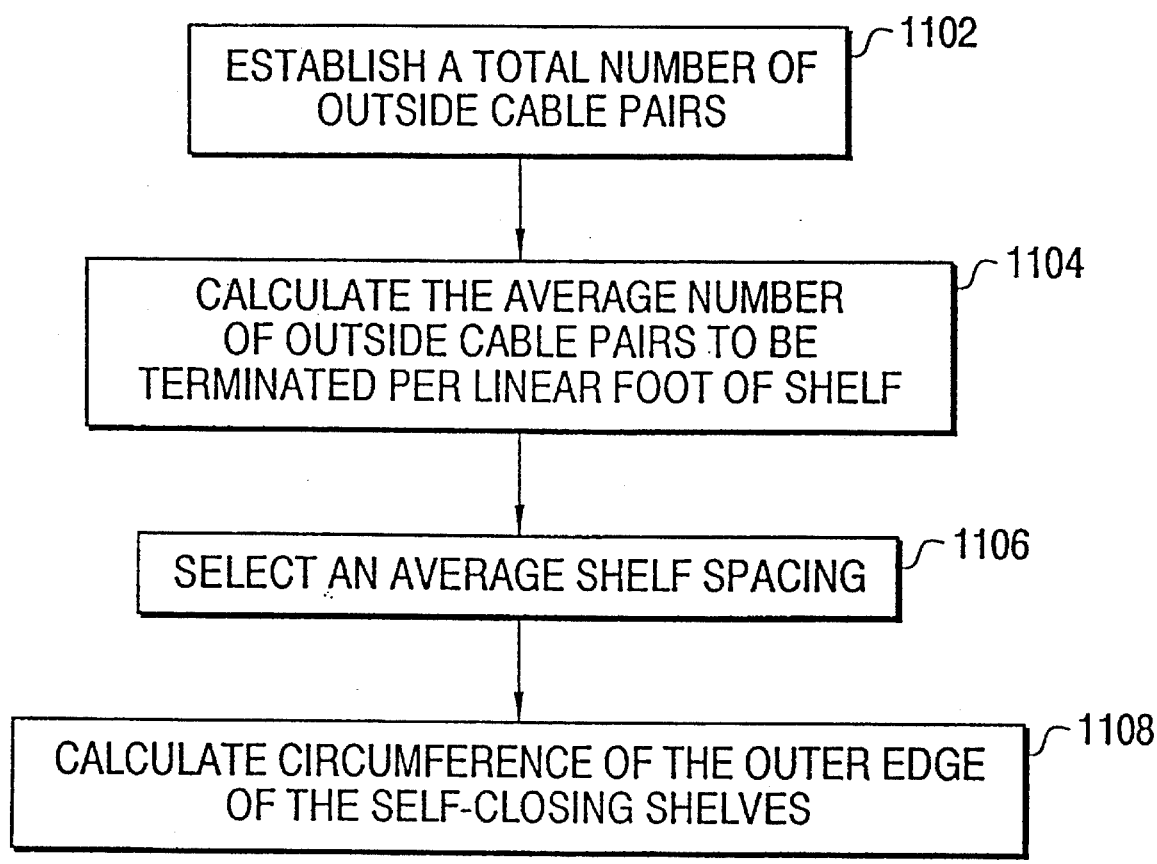

When the two factors of self-closure and height optimization are combined, the result is a self-closing vertical growth DF. During the initial design phase of any particular DF of this type, the maximum number of terminations must first be decided. Optimum final height and circumference dimensions would then be determined as illustrated in FIG. 11.

First, in step 1102, the designer establishes the ultimate total number of outside cable pairs which will be terminated on the DF. Next, in step 1104, allowing for an equal number of inside cable pairs to be terminated, the designer determines the average number of outside cable pairs to be terminated per linear foot of shelf. Preferably, inside and outside connector blocks are placed in alternating sequence on all shelves. However, other arrangements can alteratively be employed.

Next, in step 1106, the designer selects an average shelf spacing. The average shelf spacing can be selected based on a variety parameters such as ergonomics and available central office space. Typically, the shelves are spaced at a regular interval. However, shelves can be spaced at irregular intervals (e.g. more occurring at convenient working heights and less elsewhere) as desired.

After selecting the average shelf spacing, in step 1108 the required circumference of the outer edge of the self-closing shelves is calculated as follows: $C=1.15*(TPR*S/PPF)^{1/2}$, where C=Circumference of each shelf, TPR=total outside cable pairs, S=average shelf spacing and PPF=average number of outside cable pairs per linear shelf foot.

Initially, only enough shelves need to be constructed to accommodate initial outside pair requirements. As outside pair requirements increase, the frame is expanded vertically until the number of outside cable pairs (TPR) selected in step 1102 have been terminated. This will occur when the frame reaches a height of ¾ the circumference of the shelves.

During construction, the first full circumferential layer need only be built, allowing the 2 paths of travel along each shelf. As more equipment pairs and more outside cable pairs are added, the frame will continue to grow in the vertical direction until the maximum capacity is reached. However, exceeding the optimum height would not spell disaster in terms of dangerous densities. Vertically hanging interconnections are not nearly as prone to dangerous entanglement as a pile of the same number on a shelf. The main drawback that exceeding the optimum height would create would be that the overall average length would increase to the extent that the optimum height was exceeded.

Figure 9:
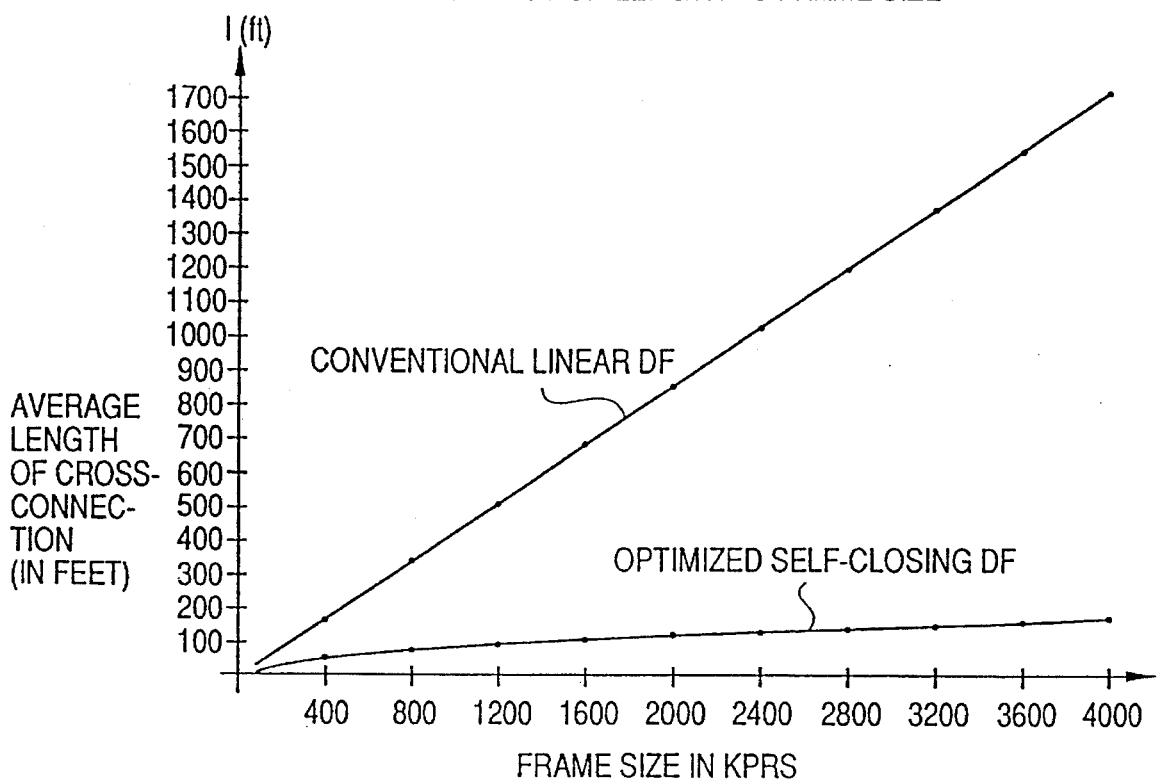
FIG. 9 is a graphical comparison of the overall average interconnection length found on conventional linear DFs as opposed to those found on optimized self-closing vertical growth DFs, as frame size, in terms of pairs terminated, increases.

When initial design parameters are reasonably correct, the lessening of overall average interconnection length for a vertical growth self-closing DF, as compared to that of a conventional linear DF, becomes quite dramatic as the number of outside pairs terminated increases. FIG. 9 illustrates this effect based on calculated data, assuming 50 outside cable pairs per linear foot are terminated in each case. For example, for 800,000 outside cable pairs terminated, the overall average length of interconnection for a linear type frame would exceed 300 feet, but on an optimized self-closing vertical growth DF, the overall average would be less than 100 feet.

Although FIG. 9 shows calculated data for conventional linear DFs having up to 4 million cable pairs, in reality such a linear DF would be impractical to build in that it would be almost a mile long and would have an average cross-connection length of 1672 feet. In contrast, a self-closing DF, according to the principles of the present invention, having 4 million cable pairs would be well within the physical limits of large buildings in metropolitan areas and would have an average cross connection length of 163 feet.

The increasingly larger savings, in terms of overall average length, that the DF of this invention generates, enhances the probability that all interconnections can be made within a central office, to create any circuit required, on a single large distributing frame, thereby eliminating the need for all intermediate distributing frames (IDFs) and their associated tie cables.

Figure 10:
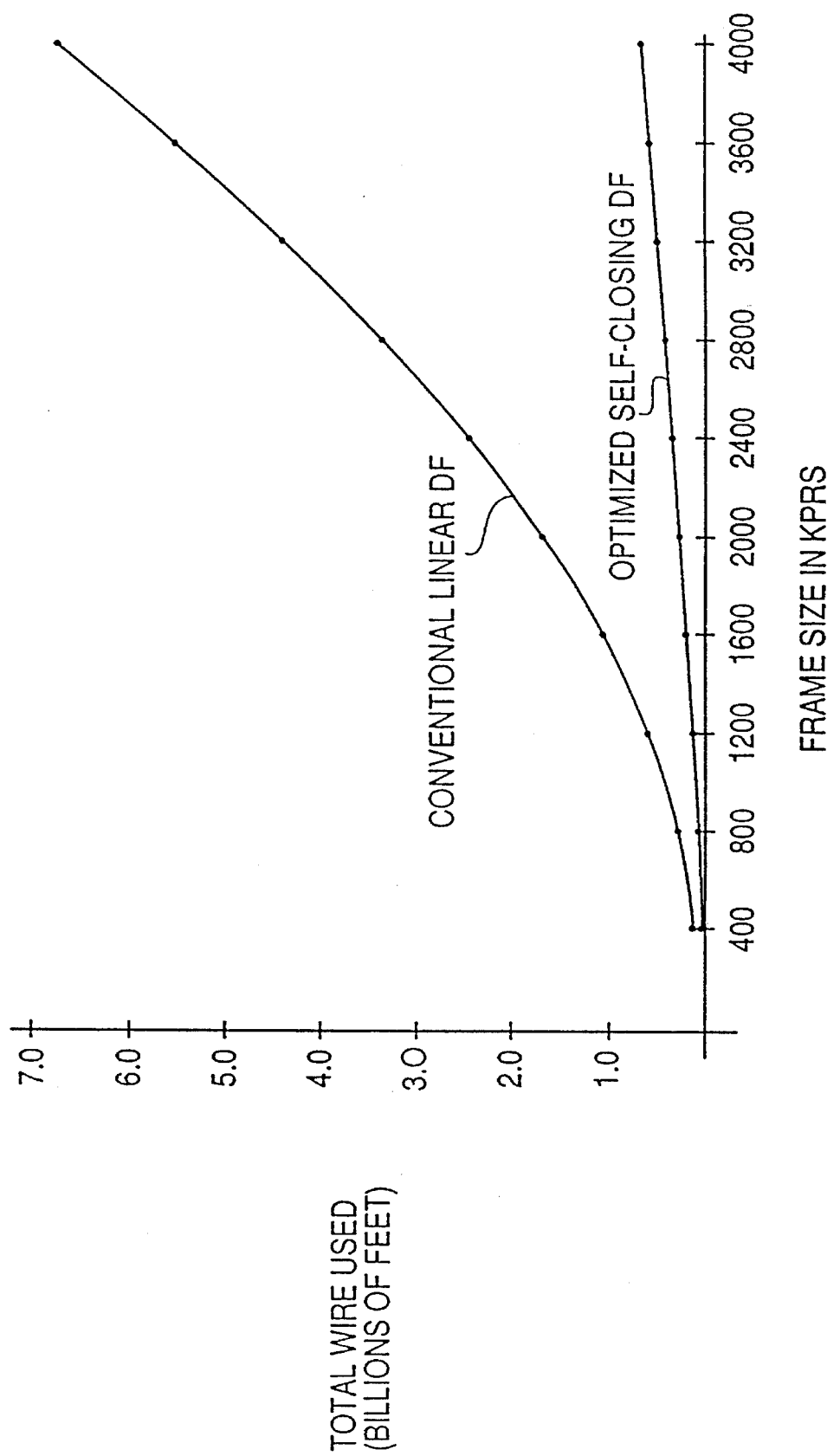
FIG. 10 is a graphical comparison of the total interconnection wire used on conventional linear DFs of the type shown in FIG. 1 and that found on optimized self-closing vertical growth DFs of the type shown in FIG. 5; and, FIG. 11 is a flow chart of a method of designing self-closing distributing frame.

FIG. 10 illustrates the total amount of wire needed to randomly, fully interconnect conventional linear and optimized self-closing DF's as a function of total pairs terminated. For 4 million outside cable pairs randomly interconnected to 4 million inside cable pairs, the amount of interconnection wiring used would be about 6.7 billion feet for a conventional linear DF of the type shown in FIG. 1, as compared to about 0.65 billion feet for the optimized self-closing DF according to the principles of the present invention.

Now that the invention has been described by way of the preferred embodiment, various enhancements and improvements will become apparent to those of skill in the art. It should be understood, however, that the preferred embodiment has been described by way of example and not as a limitation. The scope of the present invention is defined by the appended claims.

What is claimed is:

1. A distributing frame, comprising:
    a plurality of self-closing wiring shelves, each of the wiring shelves having first face for providing peripheral travel of wiring interconnections thereon, and a second face for serving as a travel surface for connector cables; and,
    a plurality of support members, connected to support the wiring shelves, one face of each of the support members serving as a traveling surface for outside wire connector cables, and an opposing face serving as a traveling surface for inside wire connector cables;
    the wiring shelves and the support members being connected so as to form an outer frame face and an inner frame face and spaces between adjacent support members, the spaces between adjacent support members and an interior edge of the wiring shelves, serving as a travel surface for interconnections traveling from one wiring shelf to another.

2. The distributing frame of claim 1, further comprising: connector blocks disposed on outer edges of the self-closing wiring shelves, whereby access to all interconnections on the distributing frame can be had from the outer frame face.

3. The distributing frame of claim 1, further comprising: riser cables disposed vertically within an interior portion of the distributing frame, wherein all outside wire pairs arrive at the proximity of their termination location via the riser cables.

4. The distributing frame of claim 1 comprising means for increasing the length of the support members and the number of the self-closing wiring shelves.

5. The distributing frame of claim 1 having a slotted structure formed therein for controlling entry to and exit from the wiring shelves and having passageways formed therein by interior edges of the wiring shelves and adjacent support members, wherein interconnections travel peripherally on the wiring shelves along a shorter of two available paths, and between the wiring shelves in an area between the support members.

6. The distributing frame of claim 1 further comprising: exterior walking bridges disposed at periodic vertical intervals, the walking bridges having slots formed therein for guiding inside wire cables to an appropriate support plane for travel to a level of the wiring shelf of termination.

7. The distributing frame of claim 1 further comprising: interior walking bridges, containing splicing traps for splicing outside wire riser cables to outside connector cables and for splicing inside wire equipment cables to inside connector cables, the interior walking bridges being installed at periodic vertical intervals.

8. A distributing frame, comprising:
    a plurality of self-closing wiring shelves, each of the wiring shelves having a surface for providing peripheral travel of wiring interconnections between external wire sources and including means for securing outside wires from the external wire sources;
    a plurality of support members connected to the wiring shelves, each of the support members including means for providing support for ones of the wiring interconnections traveling between different ones of the wiring shelves;
    the wiring shelves and the support members being connected so as to form an outer frame face, an inner frame face and an open interior defined by the inner frame face.

9. The distributing frame of claim 8, wherein the means for securing comprises connector blocks disposed on outer edges of the wiring shelves, whereby access to all interconnections on the distributing frame can be had from the outer frame face.

10. The distributing frame of claim 8, further comprising: riser cables connected within the interior of the distributing frame, wherein all of the outside wires arrive at the proximity of their termination location via the riser cables.

11. The distributing frame of claim 8 comprising means for extending the support members and means for increasing a number of the wiring shelves.

12. The distributing frame of claim 8 wherein the wiring interconnections travel peripherally on the wiring shelves along a shorter of two available paths.

13. The distributing frame of claim 8 further comprising means for controlling entry to and exit from the wiring shelves.

14. The distributing frame of claim 8 wherein the wiring shelves are disposed perpendicular to the support members.

15. The distributing frame of claim 8 further comprising: exterior walking bridges disposed at periodic intervals, the walking bridges having slots formed therein for guiding inside wire cables to the support members for vertical travel to the wiring shelf of termination.

16. The distributing frame of claim 14 further comprising: interior walking bridges, containing splicing traps for splicing outside wire riser cables to outside connector cables and for splicing inside wire equipment cables to inside connector cables, the interior walking bridges being installed at the periodic intervals.

17. A distributing frame, comprising:
    a plurality of self-closing shelves, each of the shelves having a first face for providing peripheral travel of conductor interconnections thereon, and a second face for serving as a travel surface for connector cables;

a plurality of support members, connected to support the shelves, one face of each of the support members serving as a travelling surface for outside connector cables and an opposing face serving as a travelling surface for inside connector cables; and the shelves and the support members being connected so as to form an outer frame face and an inner frame face and spaces between adjacent support members, the support members and an edge of the shelves providing a support structure for ones of the interconnections traveling from one shelf to another.

18. The distributing frame of claim 17, further comprising: connector blocks disposed on outer edges of the self-closing shelves, whereby access to all interconnections on the distributing frame can be had from the outer frame face.

19. The distributing frame of claim 17, further comprising: riser cables disposed vertically within an interior portion of the distributing frame, wherein all outside conductors arrive at the proximity of their termination location via the riser cables.

20. The distributing frame of claim 17 comprising means for increasing the length of the support members and the number of the self-closing shelves.

21. The distributing frame of claim 17 having a slotted structure formed therein for controlling entry to and exit from the shelves and having passageways formed therein by interior edges of the shelves and adjacent support members, wherein interconnections travel peripherally on the shelves along a shorter of two available paths, and between the shelves in an area between the support members.

22. The distributing frame of claim 17 further comprising: exterior walking bridges disposed at periodic vertical intervals, the walking bridges having slots formed therein for guiding inside conductor cables to an appropriate support member for travel to a level of the shelf of termination.

23. The distributing frame of claim 17 further comprising: interior walking bridges, containing splicing traps for splicing outside conductor riser cables to outside connector cables and for splicing inside conductor equipment cables to inside connector cables, the interior walking bridges being installed at periodic vertical intervals.

24. A distributing frame, comprising:

a plurality of self-closing shelves, each of the shelves having a surface for supporting peripheral travel of interconnections between external conductor sources and including means for securing conductors from the external conductor sources;

a plurality of support members connected to the self-closing shelves, each of the support members including means for providing support for ones of the interconnections traveling between different ones of the shelves; and the shelves and the support members being interconnected so as to form an outer frame face, an inner frame face and an open interior defined by the inner frame face.

25. The distributing frame of claim 24, wherein the means for securing comprises connector blocks disposed on outer edges of the shelves, whereby access to all interconnections on the distributing frame can be had from the outer frame face.

26. The distributing frame of claim 24, further comprising: riser cables connected within the interior of the distributing frame, wherein all of the outside conductors arrive at the proximity of their termination location via the riser cables.

27. The distributing frame of claim 24 comprising means for extending the support members and means for increasing a number of the shelves.

28. The distributing frame of claim 24 wherein the interconnections travel peripherally on the shelves along a shorter of two available paths.

29. The distributing frame of claim 24 further comprising means for controlling entry to and exit from the shelves.

30. The distributing frame of claim 24 wherein the shelves are disposed perpendicular to the support members.

31. The distributing frame of claim 24 further comprising: exterior walking bridges disposed at periodic intervals, the walking bridges having slots formed therein for guiding inside conductor cables to the support members for vertical travel to the shelf of termination.

32. The distributing frame of claim 30 further comprising: interior walking bridges, containing splicing traps for splicing outside riser cables to outside connector cables and for splicing inside equipment cables to inside connector cables, the interior walking bridges being installed at the periodic intervals.

33. A distributing frame, comprising:

a plurality of self-closing shelves, each of the shelves having a surface for supporting peripheral travel of interconnections between apparatus external to the distributing frame; and, a plurality of support members connected to the self-closing shelves such that the self-closing shelves and the support members form a frame structure having an outer frame face, and inner frame face and an open interior defined by the inner frame face, at least a portion of the frame structure being suitable for providing support for ones of the interconnections traveling from one shelf to another;

whereby the interconnections can be routed along the self-closing shelves and between shelf levels using the support provided by the frame structure.

34. The distributing frame of claim 24 wherein each of the shelves include means for securing conductors from the apparatus.

35. The distributing frame of claim 33 wherein the means for securing comprise connectors disposed on an outer edge of at least some of the self closing shelves.

36. The distributing frame of claim 24 wherein the interconnections are made between cable lines.

37. A method of making interconnections between communication lines, comprising the steps of:

(1) providing a distributing frame having a plurality of self closing shelves and a plurality of spaced support members connected so as to form a frame structure having an outer face, an inner face, and an open interior defined by the inner face;

(2) employing a surface of at least one of the shelves to support peripheral travel of an interconnection media;

(3) routing the interconnection media between levels of different ones of the self closing shelves; and, (4) interconnecting at least two of the communication lines to one another by way of the interconnection media.

38. The method of claim 37 comprising the further step of routing riser cables within the open interior, wherein the communication lines arrive in proximity to their termination location on one of the shelves.

39. The method of claim 38 wherein the communication lines are optical fibers.

40. The method of claim 38 wherein the communication lines are wires.

41. The method of claim 38 comprising the further step of employing a given face of the support members as a traveling surface for outside line connector cables and employing an opposing face for serving as a traveling surface for inside line connector cables.

\* \* \* \* \*